Patented Dec. 18, 1945

2,391,359

UNITED STATES PATENT OFFICE 2,391,359

METHOD OF MAKING TERPENE POLYMERS

Harold M. Spurlin, Marshallton, Del., assignor to Hercules Powder Company, Wilmington, Del., a corporation of Delaware No Drawing. Application October 24, 1942, Serial No. 463,254

4 Claims. (Cl. 260—80)

This invention relates to a method of preparing terpene resins and more particularly to the preparation of terpene resins using beryllium halide as a catalyst.

Terpene polymers have been prepared in the past using such catalysts as aluminum chloride, sulfuric acid, sulfuric acid-acetic acid mixture, phosphoric acid, phosphorous pentoxide, etc. Procedures using these catalysts are subject to many disadvantages which have militated against their widespread use. For example, an important disadvantage is found in the powerful polymerizing effect certain of these catalysts possess which tends to cause rapid and substantial temperature surges. This is undesirable, not only because the reaction may become so violent as to get out of control, but also because such elevated temperatures may result in reduced yields of resin or the product of polymerization may be of an inferior quality because of undesirable color characteristics.

Now, in accordance with this invention a new method of producing terpene polymers has been discovered which comprises polymerizing a terpene in the presence of a catalyst, which will permit heating of the reaction mixture without the attendant surging of temperature conditions found when using certain prior art catalysts, which will permit the production of lighter colored polymers not found with certain other catalysts and which will permit positive control and economic operation of the process at all times. It has been discovered that the halides of beryllium function to give these results. It has been discovered that such terpenic compositions as turpentine, pine oil, the bicyclic terpenes as, for example, alpha-pinene, and beta-pinene, the monocyclic terpenes as alpha-terpinene and sylvestrene, the acyclic terpenes as allo-ocimene, myrcene, and ocimene may be polymerized using the novel beryllium halide catalyst, and using a solvent having the ability to cause the catalyst to be dissolved as, for example, a chlorinated hydrocarbon compound as ethylene dichloride.

The method in accordance with this invention is illustrated by the following specific examples, all parts and percentages being by weight unless otherwise specified.

Example I

Seventy-five parts of beta-pinene were placed in a container together with 75 parts of methylene chloride and 1 part of anhydrous beryllium chloride and sealed. The charged container was maintained at 0° C. for one month after which time the contents of the container were removed and the catalyst decomposed by pouring into a mixture of alcohol and concentrated hydrochloric acid. The resultant mixture was a water-white viscous solution. This solution was taken up in ether and then poured into an excess of acetone where a yield of 46.5 parts of a white solid polymer was deposited. The acetone solution yielded 10.5 parts of liquid polymer which was non-volatile with steam. The balance of the material was steam volatile. Physical characteristics of the solid polymer were as follows:

White solid
Melting point ____(Capillary method)__ 103–111
Bromine number _____ 117
Molecular weight (boiling point elevation in benzene) _____ 2200

Example II

A mixture of 50 parts of methylene chloride and 1.1 parts of anhydrous beryllium chloride were refluxed for five minutes. The system was protected against the entrance of moisture. Twenty-five parts of myrcene were slowly added to the mixture and the whole refluxed for two hours. The complex formed was decomposed by pouring into an ethanol-hydrochloric acid mixture. The polymer, after treatment with dilute hydrogen chloride to remove the catalyst, was precipitated from the ethanol solution by pouring the ether mixture into an excess of acetone. A yield of white solid polymer amounting to 7.5 parts was obtained. Concentration of the acetone solution yielded 8 parts of a liquid polymer non-volatile with steam. Physical characteristics of the solid polymer were as follows:

White solid
Melting point _____ 119–129
Bromine number _____ 178
Molecular weight (boiling point elevation in benzene) _____ 1700

Example III

A mixture of 50 parts of ethylene chloride and 1.48 parts of anhydrous beryllium chloride was refluxed for five minutes in a system protected against the entrance of moisture. Twenty-five parts of allo-ocimene were slowly added to the mixture and the whole refluxed for two hours. The complex formed was decomposed by removal of the catalyst by treatment with an ethanol-hydrochloric acid mixture. An ether solution of the decomposed mixture was poured into an excess of acetone and a yield of 10.9 parts of white solid polymer was obtained. Physical characteristics of the polymer were as follows:

|  | White solid |
|---|---|
| Melting point °C | 61 |
| Bromine number | 180 |
| Molecular weight (boiling point elevation in benzene) | 615 |

In each of the foregoing examples, the beryllium chloride catalyst was prepared by passing carbon tetrachloride over the oxide of beryllium at 500° C. and condensing the sublimate.

The use of a beryllium halide catalyst for the polymerization of terpenes under conditions in accordance with this invention permits the production of terpene polymers having a relatively higher melting point than are produced using an aluminum halide as aluminum chloride under similar conditions, and permits the production of a lighter colored product without the necessity of color refining than may be realized using catalysts of a more powerful nature. The mild action of a beryllium halide catalyst to effect the polymerization of a terpenic composition permits the reaction to be carried out at higher temperatures without sacrificing quality and quantity of the product obtained.

In carrying out the polymerization reaction in accordance with this invention it is desirable to use a solvent solution of the components of the reaction mixture. Suitable solvents are, for example, hydrocarbon solvents as gasoline, xylene, butane, cyclohexane, benzene, decahydronaphthalene, and V. M. P. naphtha, chlorinated hydrocarbon solvents as methyl chloride, ethylene dichloride, ethyl chloride, thichloroethylene, tetrachloroethane, pentachloroethane, propylene dichloride, monochlorobenzene, etc. It is preferred to use the chlorinated hydrocarbon solvents because of their beneficial effect produced on the reaction.

When a solvent is used, the concentration of the terpene in the solvent may vary widely but will preferably be within the range of from about 10% to about 75% of the weight of the solvent.

The catalyst may be incorporated in the above solution either by dispersion or by solution. Furthermore, either the dispersion or the solution may be obtained by dissolving the terpene in a suitable solvent and then adding the catalyst. Alternatively, the catalyst may be first dissolved or dispersed in a solvent and the terpene then added.

Varying amounts of beryllium halide catalysts may be used. However, it is preferred to use not more than about 25% by weight of catalyst based upon the amount of terpene used. It is still more preferable to use the catalyst in an amount from about 1% to about 10%, based on the amount of terpene used. It is preferred to use the beryllium halide catalyst in the anhydrous state and to maintain this anhydrous condition by carrying out the reaction in a system protected from the entrance of moisture.

The polymerization inherent in this invention may be carried out over wide ranges of temperature. The reaction may be carried out using temperatures within the range of from about −78° C. to about 200° C. and it is preferred to use temperatures within the range of from about −5° C. to about 75° C. Where low boiling solvents are employed, it is convenient to use temperatures at or below the reflux temperature of the reaction mixture.

The terpene polymers obtained in carrying out the processes hereinbefore described may be purified in any suitable manner. The catalyst may be removed by a decomposition operation using a mixture of alcohol and concentrated hydrochloric acid. Removal of the catalyst may be facilitated by washing with solutions of aqueous acids such as aqueous sulfuric acids, hydrochloric acid, etc. The concentration of the acid in the aqueous wash solution may vary from about 5% to about 25% or more. Following the wash with the aqueous acid, the reaction mixture may be washed with water to remove any acid present. Alternatively, the catalyst may be removed by washing with aqueous bases or it may be heated and the precipitated beryllium hydroxide or beryllium oxide filtered off.

After decomposition of the reaction mixture, the resulting solution may be taken up in any suitable solvent as, for example, ether and the ether solution of terpene polymers then precipitated from solution by addition of the ether solution of terpene polymers to a medium which acts as a non-solvent for the high polymer terpene. Such medium may consist of acetone or other suitable mediums as, for example, methyl alcohol, ethyl alcohol, methyl ethyl ketone, and other polar solvents. Separation of the precipitated terpene polymers from the solvent medium may be made in any suitable manner as by distillation or filtration. Concentration of the acetone solution after separation from the solid terpene polymer yields a liquid polymer which is non-volatile with steam.

Terpenic compositions found adaptable for polymerization in accordance with the present invention are turpentine, pine oil, the bicyclic terpenes as alpha-pinene, and beta-pinene, the monocyclic terpenes as alpha-terpinene, and sylvestrene, the acyclic terpenes and particularly, the conjugated type as allo-ocimene, myrcene, and ocimene.

It will be understood that in carrying out the invention in its broadest aspect, the terpene may be used in a substantially pure state or in an admixture with other terpenes.

The present process may be carried out either continuously or by the batch method. In the continuous process, a mixture of the beryllium halide catalyst, solvent and terpene is passed through a coil of pipe where it is held at a desired temperature. The rate of feed is governed in such a manner that the reaction is substantially complete by the time the mixture reaches the end of this coil of pipe. The mixture then flows into an enlarged chamber where it is washed with water or treated in some other manner as described above to remove the catalyst. The material is filtered and introduced into a still which is advantageously maintained under reduced pressure and the solvent or volatile reactant distilled from the residue which collects in the lower portion of the still.

The polymers produced in accordance with the present invention may be subjected to a hydrogenation treatment in accordance with any of the methods well known in the art in order to produce polymers relatively free of unsaturation.

The polymers produced by means of the beryllium halide polymerization operation are useful in protective coatings, and textile finishing compositions and as adhesives.

From the foregoing, it will be seen that the present invention provides a materially improved process for the polymerization of terpene polymers by the use of a beryllium halide catalyst. The improved terpene polymers are characterized by their water-white color.

What I claim and desire to protect by Letters Patent is:

1. The process of producing a solid, substantially colorless beta-pinene polymer having an average molecular weight between about 615 and about 2200 which comprises contacting a polymerizable beta-pinene with beryllium chloride under substantially anhydrous conditions, in the presence of a chlorinated hydrocarbon solvent, at a temperature between about −78° C. and about 200° C. and recovering the resultant solid polymer.

2. The process of producing a solid, substantially colorless terpene polymer having an average molecular weight between about 615 and about 2200 which comprises contacting myrcene with beryllium chloride under substantially anhydrous conditions, in the preesnce of a chlorinated hydrocarbon solvent, at a temperature between about −78° C. and about 200° C. and recovering the resultant solid polymer.

3. The process of producing a solid, substantially colorless terpene polymer having an average molecular weight between about 615 and about 2200 which comprises contacting allo-ocimene with beryllium chloride under substantially anhydrous conditions, in the presence of a chlorinated hydrocarbon solvent, at a temperature between about −78° C. and about 200° C. and recovering the resultant solid polymer.

4. The process of producing a solid, substantially colorless terpene polymer having an average molecular weight between about 615 and about 2200 which comprises contacting a polymerizable terpene selected from the group consisting of beta-pinene, myrcene and allo-ocimene with beryllium chloride under substantially anhydrous conditions, in the presence of a chlorinated hydrocarbon solvent, at a temperature between about −78° C. and about 200° C. and recovering the resultant solid polymer.

HAROLD M. SPURLIN.